(12) United States Patent
Willimann et al.

(10) Patent No.: US 8,491,969 B2
(45) Date of Patent: Jul. 23, 2013

(54) REDISPERSIBLE POLYMER POWDER

(75) Inventors: Hongli Willimann, Baar (CH); Hans Wicki, Malters (CH); Urs Heini, Neuenkirch (CH); Alexander Zapf, Obfelden (CH); Robert Koelliker, Oberkirch (CH)

(73) Assignee: Akzo Nobel N.V., Arnhem (NL)

( * ) Notice: Subject to any disclaimer, the term of this patent is extended or adjusted under 35 U.S.C. 154(b) by 186 days.

(21) Appl. No.: 13/001,200

(22) PCT Filed: Jun. 25, 2009

(86) PCT No.: PCT/EP2009/004607
§ 371 (c)(1),
(2), (4) Date: Dec. 23, 2010

(87) PCT Pub. No.: WO2009/156164
PCT Pub. Date: Dec. 30, 2009

(65) Prior Publication Data
US 2011/0104378 A1     May 5, 2011

(30) Foreign Application Priority Data

Jun. 27, 2008  (EP) .................................. 08159268
Jun. 27, 2008  (EP) .................................. 08159286

(51) Int. Cl.
*B05D 3/02* (2006.01)
(52) U.S. Cl.
USPC ............... 427/385.5; 427/359; 427/421.1; 427/427.4; 526/335; 525/345; 524/2
(58) Field of Classification Search
None
See application file for complete search history.

(56) References Cited

U.S. PATENT DOCUMENTS

| | | | |
|---|---|---|---|
| 1,762,494 A | 6/1930 | Wescott | |
| 3,965,281 A | 6/1976 | Takase et al. | |
| 4,546,132 A | 10/1985 | Miettunen | |
| 4,757,101 A | 7/1988 | Kleinert et al. | |
| 4,880,467 A | 11/1989 | Rirsch et al. | |
| 4,997,864 A | 3/1991 | Waters | |
| 5,132,183 A | 7/1992 | Gaidis et al. | |
| 5,145,748 A | 9/1992 | Gaidis et al. | |
| 5,293,938 A * | 3/1994 | Onan et al. ............... | 166/293 |
| 5,296,524 A | 3/1994 | Waters | |
| 2009/0155472 A1 | 6/2009 | Grasse et al. | |
| 2010/0081736 A1 | 4/2010 | Willimann et al. | |

FOREIGN PATENT DOCUMENTS

| | | |
|---|---|---|
| CA | 572245 | 3/1959 |
| DE | 36 06 742 | 9/1987 |
| DE | 36 06 745 | 9/1987 |
| EP | 0 165 469 | 12/1985 |
| EP | 0 403 958 | 12/1990 |
| EP | 0 635 552 | 1/1995 |
| EP | 1 081 110 | 3/2001 |
| EP | 1 451 128 | 9/2004 |
| EP | 1 607 408 | 12/2005 |
| EP | 1 923 405 | 5/2008 |
| GB | 388923 | 3/1933 |
| GB | 439777 | 12/1935 |
| GB | 561491 | 5/1944 |
| GB | 749955 * | 6/1956 |
| JP | 2-283645 | 11/1990 |
| WO | 93/14042 | 7/1993 |
| WO | 2005/100455 | 10/2005 |
| WO | 2007/054148 | 5/2007 |

OTHER PUBLICATIONS

Abstract of Chou et al, Waste Management and Research, 25(1), pp. 68-76, 2007 (entered STN Mar. 29, 2007).*
Ichihashi, Yuichi, et al., "Partial Photooxidation of Ethylene with Water as Oxidant over Copper Oxide Supported on Silica", Journal of Catalysis, 2001, vol. 202, pp. 427-429.
Morton, Maurice, "Rubber Technology", Springer Verlag, 1995, p. 190, XP-002502389.
Van Beilen, Jan, "Alternative Sources of Natural Rubber", Outputs from the EPOBIO Project, Nov. 2006.
European Search Report, EP 08159268.5, mailed Nov. 14, 2008, 6 pages.
European Search Report, EP 08159286.7, mailed Nov. 25, 2008, 6 pages.
International Search Report and Written Opinion, PCT/EP2009/004606, mailed Oct. 6, 2009, 8 pages.
International Search Report and Written Opinion, PCT/EP2009/004607, mailed Oct. 6, 2009, 9 pages.
International Preliminary Report on Patentability, PCT/EP2009/004606, mailed Jun. 29, 2010, 11 pages.
International Preliminary Report on Patentability, PCT/EP2009/004607, mailed Jun. 30, 2010, 9 pages.

* cited by examiner

*Primary Examiner* — Erma Cameron
(74) *Attorney, Agent, or Firm* — Robert C. Morris

(57) ABSTRACT

The present invention pertains to a water-redispersible polymer powder based on at least one modified natural latex. The modified natural latex can be obtained by mixing natural latex with at least one radical initiator and/or oxidizing agent, by mixing and reacting natural latex with at least one olefinically unsaturated monomer and with at least one radical initiator, and/or by mixing natural latex with at least one filler. Preferably, the polymer powder contains up to about 95 wt. % of least one natural latex, about 0 to 50 wt. % of at least one protective colloid, about 2 to 70 wt. % of at least one filler and/or anti-caking agent, as well as optionally further additives. In addition, the invention pertains to a process for the preparation of the polymer powder, the use thereof as an additive in building material compositions, as well as building material compositions containing the polymer powder.

15 Claims, No Drawings

REDISPERSIBLE POLYMER POWDER

This application is a national stage filing under 35 U.S.C. §371 of PCT/EP2009/004607, filed Jun. 25, 2009, which claims priority to European Patent Application No. 08159268.5, filed Jun. 27, 2008, and European Patent Application No. 08159286.7, filed Jun. 27, 2008, the contents of which are incorporated herein by reference in their entirety.

The invention pertains to a water-redispersible polymer powder based on at least one natural latex, processes for the preparation thereof, use thereof as an additive in building material compositions, as well as building material compositions containing the water-redispersible polymer.

Frequently, synthetic polymerisates, in many cases in the form of emulsion and/or suspension polymerisates, are added to building material compositions for modification of the building material compositions.

A major drawback to liquid, water-dispersed, synthetic or natural polymerisates lies in the fact that they cannot be mixed into a dry mortar at the factory. Thus such systems, if they contain mineral binder, must be offered to the customers as two-component systems, which brings with it known drawbacks such as for instance inadequate resistance to freeze-thaw and possible mixing problems at the construction site when mixing with water.

In order to remove these drawbacks, quite some time ago water-redispersible polymer powders, also called dispersion powders or redispersion powders, were developed. For the preparation thereof in a first step aqueous dispersions are prepared, as a rule by means of emulsion or suspension polymerisation, which are stabilised by means of high-molecular compounds such as in particular partially saponified polyvinyl alcohol. In a subsequent step, the obtained dispersions are dried, optionally after the addition of further additives such as spraying adjuvants, while avoiding film formation, for which process often spray drying is selected.

Water-redispersible polymer powders are advantageously used in dry mortars, which often contain at least one mineral binder, often a hydraulically setting binder. Such dry mortars are formulated int. al. as tile adhesives, smoothing mortars, repair mortars, and as thermal insulation mortars. These last have seen increased use lately, since within the framework of climate change and higher energy prices the insulation of buildings and the energy saving derived therefrom is gaining in importance.

An important property of such thermal insulation mortars is a good adhesion of the mortar to hydrophobic substrates such as for instance the frequently used expanded polystyrene sheets. It is particularly important in that case that especially after wet storage the adhesive values are still high enough. Furthermore, also a low water absorption of the mortar matrix as well as good water-repellant properties, also called hydrophobicity, are important criteria for this application.

There have been a few attempts to use renewable raw materials, such as for instance natural latex, also known as "natural rubber latex", abbreviated as "NRL", in the building material compositions instead of the synthetic polymerisates. Natural latex is often also called natural rubber, India rubber, latex from trees, gum elastic or caoutchouc. By natural latex the person skilled in the art means the white milky juice, also called latex, which is present in the latex vessels of numerous dicotyledons and which is won by making an incision in the secondary bark of rubber or para rubber trees, in which process this latex is still present as latex, that is to say, the polymer particles are dispersed in the aqueous phase. As soon as the latex is precipitated or coagulated, the product is no longer covered by the term natural latex.

Some references disclose rubber powders obtained from coagulated natural latex. EP 1 081 110 A2 discloses a building material for the production of a coating where one component contains a powder caoutchouc and an inorganic filler. The powder caoutchouc is obtained by coagulating caoutchouc particles from a natural or synthetic source. EP 1 607 408 A1 relates to a natural rubber master batch, a production method thereof, and a natural rubber composition. The process includes cleaving the amide linkages of the natural rubber, mixing it with an aqueous slurry of filler such as carbon black, coagulating with e.g. acid, drying the obtained master batch, and compounding it, followed by vulcanizing at e.g. 150° C. for 30 minutes. Upon coagulation, the latex particle loses its spherical form and integrates into the larger coagulate. Therefore, such products cannot disintegrate into the primary latex particles anymore and show no signs of redispersion.

Some other references refer to the use of ground car tires. U.S. Pat. No. 4,546,132 claims a weather-resistant, high-strength concrete for structures subject to water that freezes to ice and melts again depending on ambient temperature, comprising a concrete mix including a cementing agent and rubber powder mixed in the concrete mix. The rubber powder, being natural or synthetic powder or mixtures thereof, has advantageously been ground from used automobile tires. WO 93/14042 describes a material containing powdered rubber for protecting concrete from the effects of freezing and thawing. The powdered rubber is preferably obtained from shredded car tires. When making car tires, latex particles from either natural or synthetic latex are also coagulated and therefore lose their shape. Hence, rubber powders obtained from ground car tires are not capable of redispersing to the initial latex particles, but retain their shape when getting in contact with water.

U.S. Pat. No. 3,965,281 relates to a paving method for e.g. roads, bridges, and floors by using a granular, powdery or flaky asphalt material mixed with crushed stone, gravel, sand or other aggregate, wherein the powdery asphalt can be obtained by rolling between a pair of rollers. Thus, e.g. powdery straight-run asphalt was mixed with powdery natural rubber at 130° C. for 30 minutes, resulting in dispersion and fusion of the rubber. The thus obtained rubberised asphalt was mixed with an aggregate to obtain a heated mixture of rubberised asphalt and aggregate coated with rubberised asphalt. Natural latex, and in particular modified natural latex and water-redispersible powders obtained therefrom, are not mentioned.

WO 2007/054148 A1 describes a building material composition, in particular a bitumen-free sealing compound, containing a polymer dispersion or a redispersion powder, polystyrene particles, ceramic hollow microspheres and synthetic hollow microspheres. As polymer dispersion natural as well as synthetic polymers can be used, such as natural rubber and synthetic resin dispersions. As redispersion powders commercially available powders are used, which are based on synthetic water-redispersible emulsion polymers and are well known to the person skilled in the art. Modified natural latex and water-redispersible powders obtained therefrom are not mentioned.

U.S. Pat. No. 4,880,467 describes uncured plaster or paste with a particle size of at most 100 micrometers, containing at least one hydraulic cement and at least one polymer latex in an amount of 1 to 20 parts by weight per 100 parts by weight of cement and 8 to 20 parts by weight of water per 100 parts by weight of cement. Hardened cementitious compositions can be prepared by heating to above 100° C. and can be used for instance as roof tiles. Instead of styrene-butadiene copolymers, the polymer latex used can for instance also be natural latex. Again, modified natural latex and water-redispersible powders obtained therefrom are not mentioned.

WO 2005/100455 describes a method for producing a polymer composition containing large amounts of filler comprising simultaneously spraying and drying a liquid containing a polymer component and a filler under an atmosphere of a shock wave generated from pulse combustion. Natural rubber latex can be used as polymer and colloidal silica can be used as filler. The obtained product is further mixed with compounding agents such as vulcanisation accelerator, followed by a vulcanisation step to obtain a vulcanised rubber sheet. Modified natural latex and water-redispersible powders obtained therefrom are not mentioned. *Rubber Technology* (1995), p. 190 (Springer Verlag) describes spray-dried natural rubber containing about 8-10 parts of suitable partitioning agents, available as a free-flowing powder. Nowhere is it mentioned that modified natural latex is used or that the obtained product is redispersible in water or that the natural latex is modified. The fact that its end use is solution adhesives allows the conclusion that the rubber is fully soluble in suitable organic solvents and therefore neither dispersible nor redispersible in water.

U.S. Pat. No. 1,513,139 discloses a method of dispersing a gum into a colloidal substance which comprises forming a viscous, plastic mass of said colloidal substance, and dispersing the gum into said mass by mastication while maintaining said colloidal substance as a continuous phase. The obtained composition can be a non-liquid preparation of a colloid and rubber. Powders are not mentioned.

GB 537,132 describes a process of hydrolysing heat-sensitive proteins with alkali for 2 days or longer, followed by dialysing and concentrating the rubber latex. Preferably, a small amount of a protective substance such as soaps, starches, and dextins or polyhydric alcohols such as glycerin are added. The evaporation may be carried out to such an extent as to furnish a highly concentrated, pasty or solid product. This can be in the form of a sheet or film or, alternatively, a powdered or granular product. The solid concentrates can be redispersible in water.

GB 316,006 discloses a method of concentrating rubber latex obtained by adding haemoglobin to the latex before complete concentration and concentrating the latex by evaporation in an atmosphere of subnormally humid air. The drying temperature must be below the coagulation point of the haemoglobin and can be about 65.5° C.

GB 388,341 describes a process for the preparation of pulveriform rubber by adding a quantity of dextrin of, e.g., 6 to 12% of the weight of the quantity of latex to be treated to the latexes and spraying them in an atmosphere of drying air or gas. A homogeneous powder is obtained from the latex mixed with the dextrin. It easily redissolves in a liquid. However, water-redispersible, free-flowing powders based on modified natural latex, and in particular those which are film-forming after redispersion, are not mentioned. Additionally, spray drying at low temperatures such as e.g. 65.5° C. is highly inefficient and it is difficult to dry the products sufficiently. Furthermore, it leads most often to film formation of the dried products themselves, since long drying times are required. Additionally, it is not possible with today's state of the art spray drying equipment to obtain the described water-redispersible powders when e.g. a mixture of even 25 wt. % dextrin and 75 wt. % natural rubber latex is spray dried.

As indicated above, an important feature of today's state of the art polymer powders suitable for use in building compositions, which are based on synthetic latexes, is that they not only disintegrate to their primary particle size when mixed with water, they are also film forming when the aqueous redispersions are dried at ambient conditions. Hence, the primary particles of the latex to be dried need to be designed in such a manner that they keep their shape after they are dried, optionally with suitable adjuvants, to form what is defined as water-redispersible powders. Furthermore, the obtained powders need to be free-flowing and must not cake for months even at elevated temperatures such as e.g. 40° C. However, when redispersed in water, the disintegrated primary particles when used in their final application, such as in building, need to coalesce and form a film even at or below ambient conditions when the water evaporates.

The water-redispersible polymer powders commercially available nowadays are based on water-insoluble synthetic polymers, and thus rely on petrochemistry. Because of the rising price of crude oil, however, the products based thereon are also becoming more expensive. Furthermore, crude oil and the products based thereon will not always be available on the scale that they are now.

The present invention has for its object to provide new raw materials which are not dependent on crude oil, such as renewable raw materials, for making water-redispersible polymer powders that are suitable for use in building material compositions, in particular in dry building material compositions, to achieve properties which are comparable or even superior to those of the traditional, (synthetic) state of the art water-redispersible polymer powders.

It was surprisingly found that the object can be achieved by means of a water-redispersible polymer powder based on at least one modified natural latex.

The polymer powder according to the invention was found to be free-flowing and to have good anti-caking properties. Thus it can be stored even for a prolonged time at e.g. 40° C. without caking. When in contact with water, it shows very good wettability and redispersibility, so that already on contact with water within a few seconds the mixture can be fully redispersed. This means that the polymer powder disintegrates finally to particles having the size of the latex particles before drying. Redispersion can even occur with no or low mixing with water. The modified latex as well as the redispersion have a high colloidal stability, thus they are very stable in high ionic liquids and pastes, including high and low pH and/or cementitious systems, and do not coagulate when mixed therein. Furthermore, they impart an excellent shear stability. Surprisingly, the degree of modification can be adjusted such that a stable and block-resistant polymer powder can be obtained without compromising the excellent film forming properties of the redispersion. Thus, when a film is cast at ambient conditions, it shows a high flexibility and elasticity with elastomeric properties. In addition, the polymer powder can be used in many different ways and is very readily miscible with all sorts of dry mortar mixtures and stored. When the dry mortar is mixed with water and cured, it imparts excellent adhesion and cohesion properties and it gives the mortar a high flexibility with elastomeric properties, even over a broad temperature range. Thus, the inventive water-redispersible polymer powder not only shows all positive properties of traditional water-redispersible polymer powders, but in addition the dependence on crude oil-based raw materials is clearly reduced.

Claimed also is a process for the preparation of the polymer powder with at least one radical initiator and/or oxidising agent, by mixing and reacting natural latex with at least one olefinically unsaturated monomer and with at least one radical initiator, and/or by mixing natural latex with at least one filler with a mean particle size of 0.05 μm or higher, and subsequent drying. In one preferred embodiment, the natural latex is mixed in the aqueous phase with at least one radical initiator and/or with at least one oxidising agent, optionally in the presence of one or several protective colloids, followed by drying while avoiding film formation.

Surprisingly, it was found that the polymer powder in building material compositions is particularly suitable for hydrophobising and/or reducing the water absorption of building material compositions which are mixed with water and cured. Furthermore, it was found that the inventive polymer powder brings excellent properties in applications exposed to low temperatures such as −20° C. or lower. Thus, the inventive powders are clearly advantageous over commercial redispersible powders. Consequently, the present invention also relates to the use of the polymer powder as an additive in building material compositions, preferably in building material compositions in powder form, and/or to a process for modifying building material compositions, in particular building material compositions in powder form, and to the building material compositions containing the polymer powder according to the invention, in particular building materials in powder form.

The invention finally provides a process for hydrophobising and/or flexibilising cured building material compositions wherein the building material compositions are stirred with water, mixed, applied to a substrate, and subsequently dried. In this process the drying can take place under ambient conditions and by means of chemical binding of the water and/or by removing the water by means of evaporation and/or absorption through the substrate. In that case it is of great advantage that no additional curing step and/or curing aid such as for instance a catalyst is needed. By ambient conditions are meant the conditions provided by the surroundings, without for instance additional heat, vapour and/or radiation being supplied.

In the process to hydrophobise cured building material compositions of the invention the polymer powder can either be worked into the building material composition and/or used for surface treatment of the building material composition. When they are worked into the building material composition, the whole building material composition is hydrophobised, even when the surface is damaged. In this case the term mass hydrophobising is used. The polymer powder according to the invention in the meaning of the invention also leads to a strongly reduced water absorption of the building material composition, even when it has an alkaline or neutral pH-value. In addition, the building material compositions attain an essentially higher flexibility as a result of the polymer powder according to the invention and a good resistance to water compared with traditional polymer powders based on synthetically prepared polymerisates.

Since the polymer powder according to the invention is present as a powder, it is possible for it to be worked into a dry mixture already at the factory, which makes possible exact dosing and a homogeneous distribution and makes its preparation particularly easy and economical. For use this dry mixture then only has to be mixed with the appropriate amount of water and applied, which brings many advantages with it, such as for instance easy handling, simplified logistics and/or resistance to freeze-thaw.

In this specification water-redispersible powder stands for a powder wherein the primary particles are designed in such a manner that they keep their shape after they are dried, optionally with suitable adjuvants. This can be done by drying them while avoiding film formation.

In order to get redispersible powders that do not form a film upon drying but are capable of film formation when used in their final application, several measures known to the person skilled in the art can be taken. These known measures include but are not limited to the addition of high-molecular weight stabilising colloids during and/or after the emulsion or suspension polymerisation. Additionally, a skilled person will know that some drying methods are more appropriate to prevent the formation of a film upon drying than others and that the conditions during drying also assist in preventing the formation of a film when drying the redispersible powder.

Another measure to prevent film formation includes ensuring that the glass transition temperature of the primary particles obtained from emulsion or suspension polymerisation is not too low, since otherwise, despite the use of added stabilising colloids, coalescence and thus film formation will occur when making the powders, which has a distinct detrimental effect on redispersion. Thus it has been shown that the glass transition temperature as a rule should not be lower than −20° C., preferably not lower than −15° C., and most preferably not lower than about −10° C., in order to obtain a polymer powder which is still readily redispersible in water, which can also be transported without any problem, and which can even be stored at +40° C.

When the aqueous, synthetic or natural polymerisate or latex has a different composition, resulting in a very low glass transition temperature, it is barely or not at all possible to prepare water-redispersible powders, and one must continue working with the liquid systems. Since the glass transition temperature of natural latex is as low as about −63° C., natural latex cannot be transformed into water-redispersible powders using the known techniques, for immediate coalescence will occur. Alternatively, if adjuvants are added to avoid coagulation, it will make film formation of the redispersion impossible.

Building material compositions are well known to the person skilled in the art and include in particular mortars, concrete, plasters, coating systems, and building adhesives. The building material compositions as a rule contain one or several binders. Quite especially preferred are compounds in the form of mixtures, in particular dry mortar mixtures, which are mixed with water only a short time before application. As one-component products, they can thus be easily transported and stored.

In one embodiment, the modified natural latex content in the polymer powder according to the invention is at least about 30 wt. %, preferably at least about 40 wt. %, in particular at least about 50 wt. %, quite particularly preferably at least about 60 wt. %, based on the polymer powder.

In a preferred embodiment, the water-redispersible polymer powder according to the invention contains up to about 95 wt. %, preferably about 5 to 85 wt. %, in particular about 10 to 75 wt. %, of at least one modified natural latex, about 0 to 50 wt. %, preferably about 2 to 30 wt. %, in particular about 5 to 20 wt. %, of at least one protective colloid, about 2 to 70 wt. %, preferably about 5 to 50 wt. %, in particular about 10 to 30 wt. %, of at least one filler and/or anti-caking agent, as well as optionally further additives, with the specifications in wt. % being based on the total weight of the polymer powder composition and in all cases adding up to 100 wt. %.

In another embodiment, the modified natural latex is mixed with synthetic polymer latex before, during and/or after the modification of the natural latex, and subsequently dried. The weight ratio of the solids content of the synthetic polymer to the solids content of the modified natural latex in water-redispersible polymer powder is about 99.9:0.1 to about 0.1:99.9, preferably about 99:1 to about 1:99, in particular about 95:5 to about 20:80, and quite particularly preferably about 90:10 to about 40:60.

In a preferred variation of this embodiment, the water-redispersible polymer powder according to the invention contains up to about 90 wt. %, preferably about 5 to 80 wt. %, in particular about 10 to 70 wt. %, of at least one water-insoluble, synthetic polymer, up to about 90 wt. %, preferably about 5 to 80 wt. %, in particular about 10 to 60 wt. %, of at least one modified natural latex, about 2 to 50 wt. %, preferably about 3 to 30 wt. %, in particular about 5 to 20 wt. %, of at least one protective colloid, about 2 to 50 wt. %, preferably about 5 to 40 wt. %, in particular about 10 to 30 wt. %, of at least one filler and/or anti-caking agent, as well as optionally further additives, with the specifications in wt. % being based on the total weight of the polymer powder composition and in all cases adding up to 100 wt. %.

Every natural latex can be used for modification to become modified natural latex in accordance with the present invention, with the plant from which it is won not playing any real role. Thus natural latex which can be used according to the invention can be won for instance from rubber or para rubber trees (*Hevea brasiliensis*), guttapercha trees, guayule shrubs (*parthenium argentum*), kok-saghys, *mimusops balata*, as well as from sow thistles (*sondchus oleraceus*) or lettuce (*lactua sativa*).

It is preferred when in natural latex at least 50 wt. % of the polymerised isoprene units is present in cis-1,4- or in trans-1,4-configuration. When a mixture of at least two different natural latexes is used, it is advantageous when in at least one natural latex at least 50 wt. % of the isoprene units is present in cis-1,4-configuration and/or in trans-1,4-configuration.

The natural latex to be used for modification according to the invention typically has a degree of polymerisation of about 500 to about 100,000, preferably of about 1,000 to about 50,000, with the degree of polymerisation being based on the chain length of the polymers prior to a possible crosslinking such as for instance vulcanisation.

After being extracted from trees, natural latex sometimes is treated with ammonia. However, in particular for use in alkaline media it is advantageous when the polymer powder according to the invention has an ammonia content in the form of $NH_3$ and/or $NH_4^+$ of less than 1 wt. %, preferably of less than 0.1 wt. %, in particular of less than 0.01 wt. %, and quite particularly preferably of less than 0.001 wt. %, based on the dry content of the powder. Should the ammonia content in the natural latex and subsequently also in the modified natural latex be too high, then it can be removed at least in part by means of known methods, such as for instance through alkaline setting of the pH-value with simultaneous and/or subsequent aspiration of the ammonia.

The modified natural latex can be prepared by performing chemical reactions in the presence of the natural latex, and thus modifying the natural latex, using processes known to the person skilled in the art. Then it also can be called chemically modified natural latex. It is preferably obtained by mixing natural latex with at least one radical initiator and/or oxidising agent. Another method of modifying it is by mixing and reacting natural latex with at least one olefinically unsaturated monomer and with at least one radical initiator. However, it also can be modified by mixing natural latex, in particular unmodified or chemically modified natural latex, with at least one filler.

The natural latex to be used for modification according to the invention can be blended before, during and/or after its modification with emulsifiers and/or colloids. Thus anionic, nonionic and/or cationic natural latexes can be used. Furthermore, in the preparation of the modified natural latex to obtain powder according to the invention use can be made of a natural latex which is free of proteins or where the protein content has been reduced. In the latter case the proteins have been partially or fully removed from the natural latex in advance by known methods.

In a first embodiment the natural latex is chemically modified before the preparation of the polymer powder according to the invention, which can be done by means of for instance hydrogenation, oxidation and/or epoxidation of the or part of the double bonds or by means of vulcanisation of the natural latex. In addition, it is possible for olefinically unsaturated monomers to be converted by means of radical polymerisation in the presence of the natural latex. Often it is advantageous when these reactions are only carried out to a minor degree, so that for instance not more than about 50 mol. %, preferably not more than about 30 mol. %, and in particular not more than 15 mol. % of the double bonds will be altered.

In another embodiment, when unsaturated monomers are converted by means of radical polymerisation in the presence of natural latex, suitable monomers and monomer classes are for instance linear, cyclic or branched $C_1$- to $C_{20}$-vinyl esters, ethylene, propylene, vinyl chloride, (meth-)acrylic acid and the linear, cyclic or branched $C_1$- to $C_{20}$-alkyl esters thereof, (meth-)acrylamide and (meth-)acrylamide with N-substituted linear, cyclic or branched $C_1$- to $C_{20}$-alkyl groups, acrylonitrile, styrene, styrene derivatives, such as alpha-methylstyrene, ortho-chlorostyrene or vinyl toluene and/or dienes, such as for instance 1,3-butadiene and isoprene. Preferred vinyl esters are linear or branched $C_1$- to $C_{12}$-vinyl esters, such as for instance vinyl acetate, vinyl stearate, vinyl formate, vinyl propionate, vinyl butyrate, vinyl pivalate, vinyl laurate, vinyl-2-ethylhexanoate, 1-methylvinyl acetate and/or $C_9$-, $C_{10}$- and/or $C_{11}$-vinyl versatate, vinyl pyrrolidone, N-vinyl formamide, N-vinyl acetamide, as well as vinyl esters of benzoic acid and p-tert-butylbenzoic acid, with vinyl acetate, vinyl laurate and/or vinyl versatate being preferred in particular. Preferred $C_1$- to $C_{12}$-alkyl groups of (meth-)acrylic acid esters and N-substituted (meth-)acrylamides are methyl, ethyl, propyl, n-butyl, i-butyl, t-butyl, hexyl, cyclohexyl, 2-ethylhexyl, lauryl, stearyl, norbornyl, polyalkylene oxide and/or polyalkylene glycol groups, in particular methyl, butyl, 2-ethylhexyl groups. Quite particularly preferred monomers are methyl methacrylate, styrene and/or styrene derivatives, in which case homo- as well as copolymerisates can be prepared.

Ionic monomers can be used as well, such as for instance 2-acrylamido-2-methylpropane sulfonic acid (AMPS), styrene sulfonic acid, (meth-)acrylic acid-sulfoalkyl esters, itaconic acid-sulfoalkyl esters, preferably in each case as $C_1$- to $C_6$-alkyl esters, vinyl sulfonic acid and the alkali, alkaline earth and/or ammonium salts thereof. Preferred are monomers containing a (meth)acrylate, a (meth)acrylamide and/or a vinyl group, in particular 2-acrylamido-2-methylpropane sulfonic acid (AMPS), styrene sulfonic acid, acrylic acid-sulfopropyl ester, itaconic acid-sulfopropyl ester, vinyl sulfonic acid, as well as in each case the ammonium, sodium, potassium and/or calcium salts. In addition, it is also possible to use olefinically unsaturated monomers with cationic functionality. The cationic charge can be prepared either through protonation of amines, in which case it is easily removable in an alkaline medium, or it can for instance be formed through quaternisation of nitrogen atoms. Non-limiting examples of such monomers are amino(meth)acrylates, vinyl pyridines, alkylamino groups-containing vinyl ethers and/or esters, alkylamino groups-containing (meth)acrylates and/or (meth)-acrylamides. Preferred cationic monomers are N,N-[(3-chloro-2-hydroxypropyl)-3-dimethylammonium propyl]-(meth)acrylamide chloride, N-[3-dimethylamino)-propyl]-(meth)acrylamide hydrochloride, N-[3-

(trimethylammonium)propyl]-(meth-acrylamide chloride, 2-hydroxy-3-(meth)acryloxypropyl-trimethyl ammonium chloride, dimethyldiallyl ammonium chloride, aziridine ethyl (meth)acrylate, morpholinoethyl(meth)acrylate, trimethyl ammoniumethyl(meth)acrylate chloride, dimethylaminopropyl(meth)acrylate, 1,2,2,6,6-pentamethylpiperidinyl(meth)acrylate, aminopropyl vinyl ether, diethylaminopropyl ether, and t-butylamino-ethyl(meth)acrylate.

In addition, further monomers, in particular monomers with functional groups up to about 50 wt. %, can be copolymerised. Non-limiting examples of such functional groups are alkoxysilane, silanol, glycidyl, epoxy, epihalohydrin, carboxyl, amine, amide, amidine, imine, N-methylol, isocyanate, hydroxyl, thiol, ammonium, aldehyde, ketone, carbonyl, ester, acid anhydride, acetoacetonate and/or sulfonic acid groups.

When olefinically unsaturated monomers are polymerised in the presence of natural latex, then the weight ratio of the thus obtained synthetic polymerisate to natural latex is about 0.1:99.9 to about 10:1, preferably about 1:99 to about 2:1, in particular about 5:95 to about 1:1, and quite particularly preferably about 1:10 to about 1:2.

The polymerisation of olefinically unsaturated monomers in the presence of natural latex can be so controlled, that the monomers form own particles which are not dependent on natural latex. Often, however, it is advantageous when as a result of suitable control of the polymerisation of the olefinically unsaturated monomers, the thus modified natural latex obtains a heterogeneous morphology. In that case it is possible on the one hand to produce a kind of core-shell morphology, with the monomers being polymerised around the natural latex itself. Another possibility is to produce other morphologies known to the skilled person, such as for instance so-called raspberry, sandwich and/or half-moon structures. A further possibility is the aggregation of typically synthetically prepared particles to the natural latex by means of known methods, for instance on the basis of ionic interactions, in which case it is advantageous when these particles have a particle size smaller than or comparable to that of the natural latex itself. Such particles can be prepared both in the presence of the natural latex and/or be prepared separately and subsequently mixed with the natural latex. In yet another embodiment the natural latex is selectively altered at the surface, for instance by means of chemical modification such as vulcanisation, oxidation, cross-linking, so that likewise a heterogeneous morphology is formed.

When the natural latex is deliberately modified in such a way that a heterogeneous morphology is formed, it is advantageous when the different phases have at least 2 different glass transition temperatures $T_g$. Since the unmodified natural latex itself has a very low glass transition temperature, the $T_g$ of the other polymer phases as a rule is set higher. Thus in the case of modified natural latex with a heterogeneous morphology often polymer powders are preferred which have at least one polymer phase with a glass transition temperature of $-20°$ C. or higher, preferably of $0°$ C. or higher, in particular of $+20°$ C. or higher.

When polymer phases are formed by means of conversion of monomers as a result of the formation of homo- and/or copolymerisates, then the glass transition temperature $T_g$ of the polymer phases to be prepared can be calculated empirically by means of the known Fox equation (T. G. Fox, *Bull. Am. Phy. Soc.* (seril) 1, 123 (1956) and *Ullmann's Enzyklopädie der Technischen Chemie*, Vol. 19, 4 th Ed., Verlag Chemie, Weinheim, 1980, pp. 17/18). This thus gives: $1/T_g = x_A/T_{gA} + x_B/T_{gB} + \ldots + x_n/T_{gn}$, wherein $X_A, X_B \ldots$ are the compound fractions of the used monomers A, B, ... (in wt. %)

and $T_{gA}, T_{gB}, \ldots$ are the glass transition temperatures $T_g$ in Kelvin of each of the homopolymerisates of A, B, . . . . These are listed for instance in *Ullmann's Encyclopedia of Industrial Chemistry*, VCH, Weinheim, Vol. A21 (1992), p. 169.

Another possible way of determining the glass transition temperatures $T_g$ of the individual polymer phases, in particular those of modified or unmodified natural latex, is experimental determination, for instance by means of DSC, in which case the midpoint temperature in accordance with ASTM D3418-82 has to be taken into consideration. In the case of greater differences between the calculated and the experimental values, in case of doubt the experimentally determined values hold. However, care needs to be taken that the natural latex is not modified too much, e.g. to such a degree that it strongly reduces film formation of the modified natural latex and/or the redispersed polymer powder. Thus, most often it is advantageous when it forms a film at room temperature upon water evaporation. The obtained film—in contrast to state of the art redispersible powders—shows elastomeric properties and is generally highly flexible and transparent. To get full benefit in certain applications it may be advantageous for the minimum film formation temperature (MFFT) to be below room temperature, typically at or below about $20°$ C., preferably at or below about $10°$ C., and in particular at or below about $5°$ C. The MFFT is determined in accordance with DIN 53787.

The mean particle size of the modified natural latex in a preferred embodiment is below 10 μm. More typically, it is from about 0.05 μm, preferably from about 0.1 μm, to about 5.0 μm, preferably to about 3.0 μm, with it also being possible to use natural latex having smaller and/or larger latex particles. The particle size is measured by means of light scattering and indicated as volumetric mean.

The polymer powder preferably contains a content of volatile organic compounds, abbreviated as "VOC", of less than about 2,000 ppm, preferably of less than about 1,000 ppm, in particular of less than about 500 ppm, based on the dry content of the powder. According to the invention, the VOCs are determined in accordance with the Directive of the European Union 2004/42/CE, which classifies as VOC each organic compound with a boiling point at a standard pressure of 101.3 kPa of $250°$ C. or lower. When the VOC-content prior to drying is too high, it can be reduced using common techniques such as for instance vapour and/or vacuum distillation and/or reacting off residual monomers.

The mean particle size of the polymer powder after drying suitably amounts to at least about 10 μm or more, preferably about 30 μm or more, in particular about 50 μm or more. In addition, it is often useful when the mean particle size is at most about 2 mm or less, preferably about 1 mm or less, in particular about 0.5 mm or less, and the polymer powder is easily pourable as well as block and storage stable. The particle size of the powder particles is preferably measured by means of light scattering, in which case the volumetric mean is also decisive.

When the polymer powder contains a protective colloid, this can be at least one water-soluble organic polymeric protective colloid and/or one ionic colloid prepared according to for instance EP 1 098 916, EP 1 109 838, EP 1 102 793, and EP 1 923 405, which is partially soluble or insoluble in water. In addition, it is also possible to use additionally or as sole protective colloid one or several natural or synthetic polymers which are only soluble in the alkaline pH-range, which means that at least about 50 wt. %, preferably at least about 70 wt. %, in particular about 90 wt. %, will dissolve in water with a pH-value of 10 as a 10 wt. % solution at $23°$ C. Non-limiting examples of this are poly(meth)acrylic acids and the copolymers thereof and/or natural resins such as for instance colophonium and the derivatives thereof.

Representative synthetic protective colloids which can be used according to the invention are for example one or several polyvinyl pyrrolidones and/or polyvinyl acetals with a molecular weight of 2,000 to 400,000, wholly or partially saponified polyvinyl alcohols and the derivatives thereof, which can be modified for instance with amino groups, carboxylic acid groups and/or alkyl groups, with a degree of hydrolysis of preferably about 70 to 100 mol. %, in particular of about 80 to 98 mol. %, and a Happier viscosity in 4% aqueous solution of preferably 1 to 100 mPas, in particular of about 3 to 50 mPas (measured at 20° C. in accordance with DIN 53015), as well as melamine formaldehyde sulfonate, naphthaline formaldehyde sulfonate, polymerisates of propylene oxide and/or ethylene oxide, including also the copolymerisates and block copolymerisates thereof, styrene-maleic acid and/or vinyl ether-maleic acid copolymerisates.

Furthermore, optionally also high-molecular oligomers, which can be present as non-ionic, anionic, cationic and/or amphoteric emulsifiers, can be used. Non-limiting examples are alkyl sulfonates, alkylaryl sulfonates, alkyl sulfates, sulfates of hydroxyl alkanols, alkyl and alkylaryl disulfonates, sulfonated fatty acids, sulfates and phosphates of polyethoxylated alkanols and alkyl phenols, as well as esters of sulfosuccinic acid, quaternary alkylammonium salts, quaternary alkylphosphonium salts, polyaddition products such as polyalkoxylates, for instance adducts of 5 to 50 moles of ethylene oxide and/or propylene oxide per mole of linear and/or branched $C_6$- to $C_{22}$-alkanols, alkyl phenols, higher fatty acids, higher fatty acid amines, primary and/or secondary higher alkyl amines, with the alkyl group each time preferably being a linear and/or branched $C_6$- to $C_{22}$-alkyl group.

Preferred synthetic protective colloids are partially saponified, optionally modified, polyvinyl alcohols with a degree of hydrolysis of 80 to 98 mol. % and a Höppler viscosity as 4% aqueous solution of 1 to 50 mPas and/or polyvinyl pyrrolidone.

In a further embodiment, natural and/or synthetically prepared protective colloids can be chosen from the group of biopolymers such as polysaccharides and polysaccharide ethers, for instance cellulose ethers such as hydroxyalkylcellulose and/or alkyl-hydroxyalkyl-cellulose, in which case the alkyl group may be the same or different and preferably is a $C_1$- to $C_6$-group, in particular a methyl, ethyl, n-propyl and/or i-propyl group, carboxymethyl cellulose, starch and starch ethers (amylose and/or amylopectin and/or the derivatives thereof), guar ethers, dextrins, agar-agar, gum arabic, carob seed grain, pectin, gum tragacanth and/or alginates. Often it is advantageous when these are soluble in cold and/or alkaline water. The polysaccharides can, but do not need to be, chemically modified, for instance with carboxymethyl, carboxyethyl, hydroxyethyl, hydroxypropyl, methyl, ethyl, propyl, sulfate, phosphate and/or long-chain alkyl groups. As synthetic polysaccharides can be used for instance anionic, nonionic or cationic heteropolysaccharides, in particular xanthan gum, welan gum and/or diutan gum. Preferred peptides and/or proteins to be used are for instance gelatin, casein and/or soy protein.

Preferred biopolymers are dextrins, cellulose ethers, carboxymethyl cellulose, starch, starch ethers, casein, soy-protein, gelatin, as well as hydroxyalkyl-cellulose and/or alkyl-hydroxyalkyl-cellulose, in which case the alkyl group may be the same or different and preferably is a $C_1$- to $C_6$-group, in particular a methyl, ethyl, n-propyl and/or i-propyl group.

As indicated above, the powder of the invention in a preferred embodiment can contain at least one anti-caking agent and/or filler. They can be mixed with the aqueous, optionally modified, natural latex before drying and/or added during and/or after drying. Anti-blocking agents and/or fillers, also called aggregates, generally are of inorganic nature, with it also being possible, however, to use organic fillers. Preferred anti-blocking agents and/or fillers are quartzitic and/or carbonatic sands and/or powders such as for instance quartz sand and/or limestone powder, carbonates, silicates, chalks, layered silicates, precipitated silicas, light-weight fillers such as for instance hollow microspheres of glass, polymers such as polystyrene spheres, alumosilicates, silica, aluminium-silica, calcium-silicate hydrate, silicon dioxide, aluminium-silicate, magnesium-silicate, aluminium-silicate hydrate, calcium-aluminium-silicate, calcium-silicate hydrate, aluminium-iron-magnesium-silicate, calcium-metasilicate, clays such as vermiculites and bentonite and/or vulcanic slag as well as pozzolanes such as metakaolin and/or latently hydraulic components, in which case the fillers and/or light-weight fillers can also have a natural or artificially generated colour.

The redispersible powder according to the invention can also contain further additives. Preferred are water-soluble polymers such as polyvinyl alcohol, thickening agents, polycarboxylates, polyacrylamides, coalescing agents, preservative agents such as biocides, herbicides, algicides and/or fungicides, anti-foaming agents, anti-oxidants, preservatives such as preservatives against oxide, heat, ozone, light, fatigue and/or hydrolysis, additives for the reduction of sedimentation and/or bleeding, surface-active compounds such as powdery and/or liquid wetting agents, anti-foaming agents and/or tensides, alkyl, hydroxyalkyl and/or alkylhydroxyalkyl polysaccharide ethers such as cellulose ethers, starch ethers and/or guar ethers, with the alkyl and hydroxyalkyl group typically being a $C_1$- to $C_4$-group, dispersing agents, further rheology control additives such as for instance casein and/or thickening agents, agents to control the hydration of minerally setting systems, in particular setting accelerators, solidification accelerators and/or setting retarders, air-entraining agents, dispersions, and water-redispersible polymer powders based on water-insoluble synthetic polymers such as for instance film-forming polymers based on vinyl acetate, ethylene-vinyl acetate, ethylene-vinyl acetate-vinyl versatate, ethylene-vinyl acetate-(meth)acrylate, ethylene-vinyl acetate-vinyl chloride, vinyl acetate-vinyl versatate, vinyl acetate-vinyl versatate-(meth)acrylate, vinyl versatate-(meth)acrylate, pure (meth)acrylate, styrene-acrylate and/or styrene-butadiene, in which case vinyl versatate preferably is a $C_4$- to $C_{12}$-vinyl ester and the polymerisates can contain about 0-50 wt. %, in particular about 0-30 wt. %, and quite particularly preferably about 0-10 wt. % of further monomers, in particular such as have functional groups, hydrophobising agents and/or additives for reduction of the water absorption capacity, in particular based on silanes, siloxanes, silicones, metal soaps, fatty acids and/or fatty acid esters, additives for the reduction of shrinkage and/or efflorescence such as for instance compounds based on natural resins, in particular colophonium and/or the derivatives thereof, as well as quarternary organic ammonium compounds, fibres such as cellulose fibres, additives for the entry of air voids, water retention agents, colour pigments as well as powders which have an alkaline reaction with water, in particular oxides and/or hydroxides of alkali and/or alkaline earth salts.

Quite especially preferred additives are polysaccharide ethers, hydrophobising agents, in particular silanes, silane esters, siloxanes, fatty acids and/or fatty acid esters, water-redispersible polymer powders, water retention agents as well as additives to control the rheology, hydration, shrinkage and/or the reduction of efflorescence.

The content of these additives can be very low for instance low-molecular surface-active substances and be in the range of about 0.01 wt. % or more, in particular about 0.1 wt. % and more, based on the dry content of the polymer powder. Typically, it is not more than about 50 wt. %, in particular not more than about 30 wt. %, based on the dry content of the polymer powder. The addition of this additive can take place before, during and/or after the drying.

In one preferred embodiment, in the process for the preparation of the polymer powder the natural latex is modified by mixing it in the aqueous phase with at least one radical initiator and/or with at least one oxidising agent, optionally in the presence of one or several protective colloids, and subsequently drying the thus obtained modified natural latex, preferably while avoiding film formation. In another preferred embodiment the aqueous natural latex is mixed and reacted with at least one olefinically unsaturated monomer and with at least one radical initiator, optionally in the presence of one or several protective colloids, and the thus obtained modified natural latex is subsequently dried, preferably while avoiding film formation. In this process attention should be paid to the fact that before drying at least about 90 wt. % of the monomer is polymerised, preferably at least 98 wt. %, in particular at least 99 wt. %. Furthermore, it can be helpful when the monomers are polymerised in the presence of at least one water-soluble reducing agent and at least one oil-soluble oxidizing agent, or vice versa.

In yet another preferred embodiment the optionally modified natural latex is mixed with at least one filler and the thus obtained modified natural latex is dried while avoiding film formation. For instance, the filler can be mixed with the natural latex as a solid and/or as an aqueous slurry and subsequently be dried using known methods such as for example spray drying. In this case it is often useful when the filler has a small particle size. Thus at least 95 wt. % of the filler particles preferably have a particle size of less than or equal to 100 μm, in particular of less than or equal to 20 μm, with the particle size being determined by sieving. In addition, it is also possible to use very small particles, for instance with a mean particle size of 0.05 μm or higher, preferably of 0.2 μm or higher, in particular of 1.0 μm or higher. The amount of filler added to modify the latex can be up to about 100 wt. %, preferably up to about 75 wt. %, in particular up to about 50 wt. %, based on the solids of the latex, and depends on the type of filler. Particularly preferred fillers are clays, silicates and/or carbonates.

When making the modified natural latex, the mixing of the natural latex in the aqueous phase with at least one radical initiator and/or with at least one oxidising agent can take place in the presence of at least one water-soluble organic polymeric protective colloid, one ionic colloid which is partially soluble or insoluble in water and/or one alkali-soluble polymer. The water-soluble organic polymeric protective colloid, the ionic colloid which is partially soluble or insoluble in water and/or the alkali-soluble polymer can also be added after the mixing, for instance directly before the drying. When the mixing is carried out in the presence of at least one monomer, the addition of the water-soluble organic polymeric protective colloid, the ionic colloid which is partially soluble or insoluble in water and/or the alkali-soluble polymer can alternatively take place before, during and/or after the addition of the monomer and/or its reaction with the radical initiator.

Preferred radical initiators are the initiator systems known for radical polymerisation, with there being no essential limitations. Thus all initiator systems known in the mentioned types of polymerisation can be used. These include thermal initiator systems, such as persulfates, for instance potassium, sodium and/or ammonium persulfate, water- and monomer-soluble azoinitiators, such as azobisisobutyronitrile, azobis-cyanovaleric acid, as well as 2,2'-azobis(2-methylpropionamidine)dihydrochloride, redox-initiator systems consisting of oxidising agents, such as for instance hydrogen peroxide, t-butyl hydroperoxide, t-butyl peroxide, isopropylbenzene monohydroperoxide, cumene hydroperoxide, t-butyl peroxopivalate, dibenzoyl peroxide, bicyclohexyl peroxydicarbonate and dicetyl peroxydicarbonate, and reducing agents, such as for instance sodium, potassium, ammonium, sulfite and disulfite, sodium, potassium and zinc formaldehyde sulfoxylate, primary, secondary, and tertiary amines with a molecular weight of preferably less than 1,000, such as tetraethylene pentamine, as well as ascorbic acid, with it being possible, if so desired, to use oxidising agents which can form free radicals by means of thermal decomposition as such, as well as catalytic initiator systems, such as for instance the system $H_2O_2/Fe^{+2}/H^+$. The content of initiators, based on the monomer content, preferably is between about 0.01 and 5 wt. %, in particular between about 0.1 and 3 wt. %.

Preferred oxidising agents are peroxides such as hydrogen peroxide or organic peroxides such as are also used for radical formation, such as for instance t-butyl hydroperoxide and/or peroxyacetic acid. But it is also possible to use persulfates such as for instance ammonium, sodium and/or potassium persulfate, percarbonates such as sodium and/or potassium percarbonate, borates such as for instance sodium and/or potassium borate, transition metals with high oxidation numbers such as for instance permanganates and/or dichromates, metal ions such as for instance $Ce^{+4}$, $Ag^+$, $Cu^{+2}$, anions of halogen oxo-acids such as for instance bromates, halogens such as for instance chlorine, fluorine, bromine and/or iodine, hypochlorites such as for instance sodium and/or potassium hypochlorite and/or ozone.

The mixing of the natural latex in the aqueous phase with at least one radical initiator and/or with at least one oxidising agent is preferably carried out at temperatures of about +5° C. or higher, preferably at about +20° C. or higher, in particular at about +30° C. or higher. Depending on the reactivity of the radical initiator and/or the oxidising agent and the reaction temperature, a very short reaction time may be sufficient. For this for instance an addition shortly before the drying can suffice. However, it is often advantageous when the mixing and/or reaction time is at least about 5 minutes, preferably at least about 10 minutes, in particular at least about 15 minutes.

The amount of radical initiator and/or oxidising agent used depends on the radical initiator and/or the oxidising agent and depends also on the desired degree of modification. Thus the weight ratio of unmodified natural latex, expressed as the solids content, to radical initiator and/or oxidising agent, expressed as the active content thereof, is about 200:1 to about 1:1, preferably about 100:1 to about 5:1, in particular about 50:1 to about 10:1.

The solids content of the modified or unmodified natural latex does not play an essential part in carrying out the processes. However, in order to have to remove as little water as possible at the subsequent drying, it is advantageous when the solids content of the natural latex is at least about 30 wt. %, preferably at least about 40 wt. %, in particular at least about 50 wt. %. Thus the solids content can also amount up to about 80 wt. %, preferably to about 75 wt. %.

The drying to obtain the polymer powder according to the invention takes place, optionally after the addition of further water-soluble polymers and/or further additives, by means which avoid or at least minimise film formation of the modified natural latex. Preferred such means are spray drying, including pulse combustion spray drying, freeze drying, fluidised bed drying, drum drying or flash drying, in which case spray drying is particularly preferred and the spraying can take place for instance by means of a spraying wheel, one-component or multi-component nozzle. If necessary, the mixture to be dried can still be diluted with water, in order to achieve a suitable viscosity for the drying. The drying temperature in principle has no real limits. In particular because of safety-related considerations, however, it should not, as a rule, exceed about 200° C., in particular about 175° C. In order to attain sufficiently efficient drying, temperatures of the inlet air of about 110° C. or higher, in particular of about 120° C. or higher, are preferred.

The building material compositions of the present invention in one embodiment contain, based on the dry content of the building material composition, at least about 0.1 wt. %, preferably at least about 0.5 wt. %, in particular at least about 1.0 wt. % and/or at most about 50 wt. %, preferably at most about 40 wt. %, in particular at most about 30 wt. %, of the polymer powder according to the invention.

In one preferred embodiment, the building material compositions contain at least one minerally setting binder. In another preferred embodiment the building material compositions contain no or less than 5 wt. %, preferably less than 2.5 wt. %, of a minerally setting binder.

By mineral binders are meant in the meaning of the invention binders which as a rule are in powder form and in particular consist of at least a) one hydraulically setting binder, b) one latent hydraulic binder and/or c) one non-hydraulic binder which reacts under the influence of air and water.

As hydraulically setting binders can be used cement, in particular Portland cement, for instance in accordance with EN 196 CEM I, II, III, IV and V, high-alumina cement and/or gypsum, by which are meant in the meaning of this invention in particular calcium sulfate in the form of α- and/or β-semihydrate and/or anhydrite of form I, II and/or III. As latent hydraulic binders pozzolanes such as metakaolin, calcium metasilicate and/or vulcanic slag, vulcanic tuff, trass, fly ash, acid blast-furnace slag and/or silica dust can be used, which react hydraulically in combination with a calcium source such as calcium hydroxide and/or cement. As non-hydraulic binder can be used in particular lime, mostly in the form of calcium hydroxide and/or calcium oxide. Preferred above all are pure Portland cement-based construction material compounds, a mixture of Portland cement, high-alumina cement, and calcium sulfate, as well as gypsum-based building material compositions, with it being possible in each case, if so desired, to also add latent hydraulic and/or non-hydraulic binders.

The dry mortar mixtures according to the invention can be formulated for instance as coating or composite mortars, thermal insulation mortars, sealing compounds, in particular flexible sealing compounds for low temperature applications, gypsum and/or lime and/or cement plasters, repair mortars, tile grouts, ceramic tile adhesives, plywood mortars, bonding mortars, cement primers, waterproofing membranes, cementitious coatings and adhesives for concrete, pipelines and ship decks, powder paints, parquet adhesives, self-levelling floor screeds, smoothing and/or trowelling compounds. Due to the hydrophobicity and low water absorption achieved by the polymer powder according to the invention, such mortars can be used outdoors as well as indoors.

EXAMPLES

The invention is further elucidated with reference to the following examples. Unless indicated otherwise, the tests are carried out at an ambient temperature of 23° C. and a relative humidity of 50%.

Abbreviations Used:

| | |
|---|---|
| MMA | Methyl methacrylate |
| BA | Butyl acrylate |
| MADQUAT | a 80 wt. % aqueous solution of N,N-dimethyl-aminoethyl-methacrylate methyl chloride |
| MAPTAC | a 50 wt. % aqueous solution of N,N-dimethyl-aminoethyl-methacrylamide methyl chloride |
| AA | Acrylic acid |
| VAc | Vinyl acetate |
| SFS | Sodiumformaldehyde sulfoxylate |
| TBHP | a 70 wt. % aqueous solution of tert-butyl hydroperoxide |
| TEPA | Tetraethylene pentamine |
| NRL | Natural latex (Natural Rubber Latex) |
| PVOH | Polyvinyl alcohol with a degree of hydrolysis of 88 mol. % and a Höppler viscosity as 4% aqueous aqueous solution of 4 mPas. |
| ETICS | External Thermal Insulation Composite System |
| ETAG 004 | Guideline for European Technical Approval of External Thermal Insulation Composite Systems with Rendering, European Organisation for Technical Approvals |

Preparation of Dispersions and Powders

Example 1

Preparation of Dispersion D-1

In a 12-liter polymerisation reactor with mechanical agitator 4,500 g of anionic NRL (LCS Revertex, solids content 67.5 wt. %) were slowly added with stirring to a mixture of 700 g of water and 1,680 g of a 24 wt. % aqueous solution of PVOH, followed by adjusting the pH value with 10 wt. % aqueous sodium hydroxide solution to about 10 and adding 200 g of MMA as well as a mixture of 22.5 g of TBHP in 225 g water. The reactor temperature was adjusted to 30° C. A mixture of 8.13 g TEPA in 81.25 g water was slowly added over 45 minutes, followed by a waiting period of 15 minutes. This was repeated three times, with the last addition being dosed in over 20 minutes. A mixture of 3.25 g TBHP in 32.5 g water was added after 45, 105, 165, 210, and 235 minutes of the initial TBHP addition. 408 g of MADQUAT were added 165 minutes after the start of the first TEPA addition. After 225 minutes, 45 g of a 20 wt. % aqueous solution of SFS were added and the reaction temperature was increased to 50° C. over 75 minutes. 15 minutes after the start of the temperature increase, 30 g of a 15 wt. % aqueous solution of SFS were added over 15 minutes. After 5 minutes, 200 g of a 10 wt. % aqueous solution of sulfuric acid were added, followed by the addition over half an hour of 90 g of a 10 wt. % aqueous solution of hydrogen peroxide, which was started 10 minutes after the completion of the sulfuric acid addition. After maintaining the reaction temperature for 90 minutes at 50° C. the reactor was cooled and discharged. The result was a clean, whitish dispersion without grits with a solids content of 47 wt. %, a pH of 6.7, and a Brookfield viscosity of 1,750 mPas, measured at 23° C. and 100 rpm. The resultant dispersion shows two distinctly different glass transition temperatures Tg at −63° C. and between +30° C. and +65° C., with the inflection temperature being at +57° C.

Although MMA, which was polymerised well before MADQUAT was added, as a homopolymer has a glass transition temperature of +105° C., no indication of such a high glass transition temperature was observed. The fact that the range of the glass transition temperature is much lower indicates that at least some of the MMA has reacted onto the surface of the NRL.

Example 2

Preparation of Dispersion D-2

In a 2-liter polymerisation reactor with mechanical agitator 500 g of anionic NRL (LCS Revertex, solids content 67.5 wt. %) were slowly added with stirring to 200 g of water, followed by adding 100 g of MAPTAC, 50 g of MMA, and a solution of 2.0 g of TBHP in 20 g water. No stabilisers such as surfactants and/or protective colloids such as partially saponified polyvinyl alcohol were added. The reactor temperature was adjusted to 30° C. 0.5 g of a 10 wt. % aqueous solution of TBHP and 0.5 g of a 10 wt. % aqueous solution of SFS were added 50 and 90 minutes after the monomer addition. The reaction was cooled after 3 hours, followed by discharging the reactor. The result was a clean, whitish dispersion with a solids content of 48.3 wt. % and low viscosity. The resultant dispersion shows two distinctly different glass transition temperatures Tg at −63° C. and between +35° C. and +67° C., with the inflection temperature being at +57° C.

Example 3

Colloidal Stability Test of the Obtained Dispersions D-1 and D-2

1 g of the obtained dispersions D-1 and D-2 was mixed with two drops (ca. 0.1 g) of concentrated formic acid. Both dispersions showed excellent stability and even after several hours no signs of aggregation, grit and/or coagulation. This is particularly surprising for D-2, since no stabilisers such as surfactants or protective colloids were added to the NRL at any time. However, when only a small amount (one drop or less) of even diluted formic acid was added to the initial, unmodified NRL, immediate coagulation of the NRL occurred.

Example 4

Preparation of Dispersion D-3

212 g of a cationic NRL (Revertex 1497C-65, solids content 65 wt. %), 266 g of a cationic stabilising colloid based on MADQUAT, MMA, BA, AA (23/38/38/1) prepared according to EP 1 109 838 without any addition of surfactants or protective colloids, 40 g of a 25 wt. % aqueous solution of PVOH, 20 g of a 10% aqueous solution of sodium hydroxide, and 90 g water were charged to a 2-liter polymerisation reactor with mechanical stirrer and heated to 76° C. One minute after the addition of 2.5 g TBHP the dosing of a mixture of 316 g VAc and 72 g BA took place over a period of 120 minutes. Parallel therewith the dosing of a solution of 2.5 g NFS in 250 g water took place over a period of 150 minutes. Next, the addition of 1 g TBHP as well as a solution of 0.2 g NFS in 2 g water took place. After a further 15 minutes the content was cooled to room temperature. Obtained was a white dispersion with a solids content of 59.5 wt. %, a Brookfield viscosity at 23° C. of 3,300 mPas, and a pH-value of 4.6.

Example 5

Preparation of Dispersion D-4

Example 4 was repeated, with use being made of the same cationic stabilising colloid based on MADQUAT, MMA, BA, AA (23/38/38/1) and 83 g of a 25 wt. % aqueous solution of PVOH. Obtained was a white dispersion with a solids content of 58.5 wt. %, a Brookfield viscosity at 23° C. of 1,350 mPas, and a pH-value of 4.60.

Example 6

Preparation of Powders from D-1 and D-2

840 g of dispersions D-1 and D-2, respectively, were mixed according to Table 1 with various amounts of a 25 wt. % aqueous solution of PVOH with stirring. Afterwards, the solids content was diluted with water to 25 wt. %. The resulting mixture was dried, without further additives, by means of conventional spray drying at an inlet temperature of 125° C. to a whitish, readily water-redispersible powder in good yield, in which process no fouling worth mentioning could be detected in the spray tower. The obtained powders were mixed with 0.5 wt. % of a commercially available silica and 18 wt. % of a commercially available carbonate.

TABLE 1

Formulations for the preparation of powders based on D-1 and D-2.

| Exp.No. | Dispersion type | PVOH amount [a] |
|---|---|---|
| P-1a | D-1 [b] | 0 |
| P-1b | D-1 | 7.5 |
| P-1c | D-1 | 10 |
| P-1d | D-1 | 12 |
| P-2a | D-2 | 0 |
| P-2b | D-2 | 1 |
| P-2c | D-2 | 3 |
| P-2d | D-2 | 10 |

[a] The amount of added PVOH is reported as wt. % of solid PVOH relative to the sum of the solids of the dispersion and the added PVOH.
[b] The pH of the dispersion was adjusted to pH 10 before spray drying, using a 10 wt. % aqueous sodium hydroxide solution.

Example 7

Preparation of Powder P-3

To 45.9 g of a 25 wt. % aqueous PVOH solution were added at room temperature, with stirring, 198.4 g of a polyvinyl alcohol-stabilised ethylene-vinyl acetate dispersion with an ethylene content of 25% and a solids content of 56 wt. %, as well as 22 g of a commercially available NRL (Revertex 888-36; solids content 68 wt. %). The obtained mixture was then mixed with 0.86 g of a 25% aqueous solution of hydrogen peroxide and heated for 60 minutes at 60° C. with stirring, which did not lead to a change in the particle size (measured with light scattering). Then the solids content was diluted with water to 25 wt. %. The resulting mixture was dried, without further additives, by means of conventional spray drying at an inlet temperature of 125° C. to a whitish, readily water-redispersible powder in good yield, in which process no fouling worth mentioning could be detected in the spray tower. The obtained powder was next mixed with 0.5 wt. % of a commercially available silica and 18 wt. % of a commercially available carbonate.

Example 8

Preparation of Powder P-4

Example 7 was repeated, with use being made of 4.3 g of a 25% aqueous solution of hydrogen peroxide, which likewise did not lead to a change in the particle size (measured with light scattering). The result was a whitish, readily water-redispersible powder in good yield, in which process no fouling worth mentioning could be detected in the spray tower.

Example 9

Preparation of Powder P-5

840 g of dispersion D-3 were mixed with 160 g of a 25 wt. % solution of PVOH with stirring. Then the solids content was diluted with water to 25 wt. %. The resulting mixture was dried, without further additives, by means of conventional spray drying at an inlet temperature of 125° C. to a whitish, readily water-redispersible powder in good yield, in which process no fouling worth mentioning could be detected in the spray tower. The obtained powder was mixed with 0.5 wt. % of a commercially available silica and 18 wt. % of a commercially available carbonate.

Example 10

Preparation of Powder P-6

Example 9 was repeated, with use being made of 843 g of dispersion D-4 and 156 g of a 25 wt. % solution of PVOH. The result, in good yield, was a whitish, readily water-redispersible powder, in which process no fouling worth mentioning could be detected in the spray tower.

The spray-dried powders are comparable to today's commercial redispersible powders. Hence, they all are e.g. free-flowing and impart good anti-caking properties.

Example 11

Redispersion of the Obtained Powders

By way of example, 50 g of powder P-1b were mixed with the same amount of water for 1 minute at 850 rpm using a propeller strirrer. After a 15-minute maturing time, the particle size of the obtained redispersion was measured by light scattering. The obtained 1.4 µm reflects the volumetric mean particle size and clearly indicates full redispersion. The other powders showed similar redispersion behaviour.

Reference Example 1

75 g of an aqueous dextrin solution (Dextrin A-330, Blattmann) with a solids content of 50 wt. % were mixed with 160 g of anionic NRL (LCS Revertex, solids content 67.5 wt. %) and diluted with 360 g of water. It was attempted to spray dry the resultant mixture by means of conventional spray drying at an inlet temperature of 125° C. Instead of a powder, wet lumps were obtained in low yields, which were not redispersible at all in water.

Reference Example 2

Reference example 1 was repeated, but 187.5 g of a 20 wt. % aqueous PVOH solution were used instead of the dextrin solution. Immediate thickening was observed, followed by strong agglomeration and signs of coagulation. Spray drying of the obtained product thus was not possible.

Reference Example 3

Powder P-7

Powder P-7 is a commercially available, water-redispersible dispersion powder based on a polyvinyl alcohol-stabilised vinyl acetate-ethylene dispersion with 25 wt. % ethylene.

Reference Example 4

Powder P-8

Powder P-8 is a commercially available, water-redispersible dispersion powder based on a polyvinyl alcohol-stabilised vinyl acetate-ethylene dispersion with 10 wt. % ethylene.

Example 12

Stress-Strain Curves of Powder Films

Powders were redispersed as described in Example 11. From the obtained redispersion a film was cast with a wet thickness of 1.0 mm. After a drying time of 7 days at 23° C. and a relative humidity of 50%, a specimen was cut out to determine the stress-strain curve according to EN ISO 527 at a speed of 100 mm/min.

TABLE 2

| Maximum Stress and Elongation of powder films | | |
|---|---|---|
| Powder from Exp. No. | Max. Stress [N/mm$^2$] | Elongation at $F_{max}$ [%] |
| P-1b | 6.23 | 345 |
| P-1c | 6.95 | 320 |
| P-1d | 7.37 | 284 |
| P-2d | 9.35 | 417 |
| P-7 (ref.) | 5.80 | 530 |
| P-8 (ref.) | 5.28 | 283 |

Although the powder films of the inventive powders P-1b, P-1c, P-1d, and P-2d impart a higher maximum stress than the reference powders P-7 and P-8, as well as a not so high elongation at maximum force ($F_{max}$) as reference powder P-7, due to their elastomeric properties they possess a distinctly higher flexibility at low force. Furthermore, they deform reversibly over a long elongation range. Surprisingly, these properties occurred not only when the stress-strain curves of the powder films were measured at 23° C., but also at −20° C. as well as at +70° C. However, the stress-strain curves of the reference powders P-7 and P-8 impart a high force already at low elongation at 23° C. Additionally, they also tend to deform irreversibly already when a small force is applied. When measured at −20° C., which is well below the glass transition temperature of the reference powders P-7 and P-8, they do not show any flexibility at all and break without any elongation. These facts reflect that P-7 and P-8, as typical representatives of today's commercial redispersible powders, have thermoplastic behaviour with no or only a very limited elastomeric range.

Preparation of Dry Mortar Master Batches

Example 13

Preparation of Cement-Based Dry Mortar Master Batch TM-1

5 kg of a cement-based dry mortar master batch TM-1 were prepared, consisting of 280 parts by weight of a commercially available Portland cement CEM I 42.5, 583 parts by weight of a quartz sand (0.1-0.6 mm), 100 parts by weight of a commercially available calcium carbonate (Durcal 65), and 2 parts by weight of a commercially available cellulose ether (methylhydroxyethyl cellulose), in which process the components were mixed in a 10 l vessel with a FESTO stirrer until a homogeneous dry mortar master batch was obtained.

Example 14

Preparation of Cement-Based Dry Mortar Master Batch TM-2

5 kg of a cement-based dry mortar master batch TM-2 were prepared, consisting of 350 parts by weight of a commercially available Portland cement CEM I 52.5, 400 parts by weight of a quartz sand (0.1-0.3 mm), 100 parts by weight of a commercially available calcium carbonate (Durcal 65), 5 parts by weight of a commercially available cellulose fibre, and 5 parts by weight of a commercially available cellulose ether (methylhydroxyethyl cellulose), in which process the components were mixed in a 10 l vessel with a FESTO stirrer until a homogeneous dry mortar master batch was obtained.

Application-Specific Testing

Preparation of the Mortar Premix:

The amounts indicated in Tables 3 to 5 (parts by weight) of the dry mixture in question were first of all mixed dry with the further pulverulent additives or the powder according to the invention. Subsequently, the respective mixtures were stirred for 60 seconds with the amount of water indicated in the Tables, based on 100 parts of dry mortar formulation, with a 60 mm propeller stirrer at a rate of 800 rpm, with the mixing water being introduced. After a maturing time of 3 minutes the mortar was briefly stirred again by hand and applied.

Example 15

Determination of Hydrophobicity by Means of the Water Drop Method

The ready mixture was applied with the aid of spacers in a layer thickness of 5 mm on a cement fibre board, with the mortar in the lower part being drawn away without spacers to grain size (zero coating). The prepared samples were next stored for 1 day at 23° C. and 50% relative humidity. On the two mortar surfaces (5 mm and zero coating) of the respective samples 0.5 ml water each was applied with a pipette, with the time being measured until the water drops applied were fully absorbed by the mortar substrate.

TABLE 3

Determination of the hydrophobicity of the cement-based dry mortar master batch TM-1 mixed with different additives in powder form (indication in wt. %) and with 22 wt. % mixing water (on 100 wt. % dry mortar formulation)

| Experiment No. | 1.1 (Ref.) | 1.2 | 1.3 |
|---|---|---|---|
| TM-1 | 96% | 96% | 96% |
| powder P-7 (Ref.) | 4% | | |
| powder P-3 | | 4% | |
| powder P-4 | | | 4% |
| 5 mm-layer | 35 min. | 100 min. | >120 min. [a] |
| zero coating | 3 min. | 60 min. | 90 min. |

[a] The water drop was still visible on the mortar surface even after 2 hours.

The results in Table 3 clearly show that with the powder according to the invention a cement-based dry mortar mixture can be formulated which shows a clearly increased hydrophobicity in the applied and cured state. These results are even more surprising since P-3 and P-4 contain only a small portion of modified natural latex, but have a big impact on the hydrophobicity of the cured mortar.

Example 16

Determination of the Water Absorption for ETICS-Mortar According to ETAG 004

The stirred mortar premix was applied to 60 mm thick EPS-boards (expanded polystyrene; 20 kg/m$^3$; size 20×25 cm) in a thickness of 3 mm and next stored for 7 days at 23° C. and 50% relative humidity. Two days before the end of the storage 1 cm of the mortar surface and 2 cm of the adjoining side surfaces were coated with a water-impermeable coating compound (Sempafix 80/10), so that a test surface of 18×23 cm was formed (414 cm$^2$). After storage had taken place the samples were immersed for 24 hours with the coated surfaces down in a container with pure tap water. Next, they were dried at 50° C. for 24 hours. This cycle was carried out three times in all. After these three cycles the samples were stored for a further 24 hours at 23° C. and 50% relative humidity.

The samples were weighed as follows: prior to the storage in water (G0) and after 1 hour (G1) and 24 hours (G24) of storage in water, with the samples being taken out of the water, carefully dried, and immediately weighed to this end. From the averaged weights G0, G1, and G24 the water absorption can be calculated as follows:

$$\text{Water absorption [kg/m}^2\text{] in 1 h} = ((G1-G0)[g]/414\ [cm^2])\times 10$$

$$\text{Water absorption [kg/m}^2\text{] in 24 h} = ((G24-G0)[g]/414\ [cm^2])\times 10$$

TABLE 4

Determination of the water absorption of an ETICS-mortar, prepared from the dry mortar master batch TM-1 with an amount of mixing water of 22 wt. %, based on 100 wt. % dry mortar formulation

| | Test No. | |
|---|---|---|
| | 2.1 (Ref.) | 2.2 |
| TM-1 | 98% | 98% |
| powder P-7 (Ref.) | 2% | |
| powder P-3 | | 2% |
| water absorption after 1 h [kg/m$^2$] | 0.16 | 0.02 |
| water absorption after 24 h [kg/m$^2$] | 0.52 | 0.12 |

It becomes clear from Table 4 that, in spite of the low content of NRL in powder P-3 according to the invention, as a result of its addition the applied ETICS-mortar 2.2 shows a clearly reduced water absorption compared to reference mortar 2.1 containing the comparative powder P-7 without NRL.

Example 17

Determination of the Adhesive Tensile Strength of a Tile Adhesive

To determine the adhesive tensile strengths, after a zero-coating the mortar was applied on a slab of concrete with a 6×6×6 mm serrated trowel at an angle of 60°. After a bedding time of 5 minutes vitrified tiles of 5×5 cm in size were laid in the mortar bed by hand and weighted with 2 kg for 30 seconds. The measuring of the adhesive tensile strengths (in accordance with CEN EN 1348) took place after the respective storage ("D"—dry storage: 28 days at 23° C. and 50% relative humidity; "W"—wet storage: 7 days of dry storage followed by 21 days in a water bath).

TABLE 5

Determination of the adhesive tensile strength after different storages of a tile adhesive prepared from the dry mortar master batch TM-2 with an amount of mixing water of 27 wt. %, based on 100 wt. % dry mortar formulation

|  |  | Test No. | | |
| --- | --- | --- | --- | --- |
|  |  | 3.1 (Ref.) | 3.2 | 3.3 |
| TM-2 |  | 97% | 97% | 97% |
| powder P-8 (Ref.) |  | 3% |  |  |
| powder P-5 |  |  | 3% |  |
| powder P-6 |  |  |  | 3% |
| adhesive tensile | D [N/mm$^2$] | 1.20 | 1.09 | 1.04 |
| strength | W [N/mm$^2$] | 0.69 | 0.68 | 0.69 |
|  | D/W [%] | 57.5 | 62.4 | 65.4 |

It is clear from Table 5 that the adhesive tensile strengths of samples 3.2 and 3.3 with the powders according to the invention after dry storage are slightly lower than those of reference sample 3.1 and after wet storage are comparable therewith. However, since the adhesive tensile strengths are lower after wet storage (W) than after dry storage (D), the decrease of the dry/wet strength (D/W) also plays an important part. Here it is shown that the samples according to the invention have a lower percentage decrease. This means that the adhesion of the tiles on the mortar is reduced less by the wet storage, which is a clear advantage vis-à-vis the reference mortar containing a commercially available powder.

The invention claimed is:

1. A water-redispersible polymer powder containing at least one modified natural latex, wherein the modified natural latex is obtained by mixing and reacting natural latex with at least one olefinically unsaturated monomer and with at least one radical initiator, and wherein the powder is obtained by subsequent drying said modified natural latex, wherein the drying is spray drying, pulse combustion spray drying, freeze drying, fluidized bed drying, drum drying or flash drying.

2. The polymer powder according to claim 1, wherein the polymer powder contains
  up to 95 wt. % of at least one modified natural latex,
  0 to 50 wt. % of at least one protective colloid
  2 to 70 wt, % of at least one filler and/or anti-caking agent,
wherein the specifications in wt. % are based on the total weight of the polymer powder and in each case add up to 100 wt. %.

3. The polymer powder according to claim 2, wherein the polymer powder further contains additives selected from the group consisting of colour pigments, cellulose ethers, cellulose fibers, water-redispersible polymer powder based on water-insoluble synthetic polymers, dispersing agents, water-soluble polymers, thickening agents, water retention agents, starch ethers, guar ethers, wetting agents, polycarboxylates, polyacrylamides, hydrophobising agents, air-entraining agents, coalescing agents, preservative agents, anti-foaming agents, anti-oxidants, preservatives against oxide, preservatives against heat, preservatives against ozone, preservatives against light, preservatives against fatigue, preservatives against hydrolysis, rheology control additives, additives for the reduction of efflorescence, additives for the reduction of shrinkage, additives for the reduction of sedimentation, additives for the reduction of bleeding, setting accelerators, solidification accelerators, setting retarders and/or powders which have an alkaline reaction with water.

4. A building material composition containing the polymer powder according to claim 2.

5. The building material composition according to claim 4, further containing at least one minerally setting binder.

6. The polymer powder according to claim 1, wherein the polymer powder further contains additives selected from the group consisting of colour pigments, cellulose ethers, cellulose fibers, water-redispersible polymer powder based on water-insoluble synthetic polymers, dispersing agents, water-soluble polymers, thickening agents, water retention agents, starch ethers, guar ethers, wetting agents, polycarboxylates, polyacrylamides, hydrophobising agents, air-entraining agents, coalescing agents, preservative agents, anti-foaming foaming agents, anti-oxidants, preservatives against oxide, preservatives against heat, preservatives against ozone, preservatives against light, preservatives against fatigue, preservatives against hydrolysis, rheology control additives, additives for the reduction of efflorescence, additives for the reduction of shrinkage, additives for the reduction of sedimentation, additives for the reduction of bleeding, setting accelerators, solidification accelerators, setting retarders and/or powders which have an alkaline reaction with water.

7. A building material composition containing the polymer powder according to claim 1.

8. The building material composition according to claim 7, further containing at least one minerally setting binder.

9. The building material composition according to claim 8, wherein the building material composition is a dry mortar, is formulated as a coating or composite mortar, thermal insulation mortar, sealing compound, gypsum plaster, lime plaster, cement plaster, repair mortar, joint adhesive, ceramic tile adhesive, plywood mortar, bonding mortar, cement primer, cementitious coating for concrete, powder coating, parquet adhesive, smoothing compound and/or trowelling compound.

10. The building material composition according to claim 7, further containing no or less than 5 wt. % of a minerally setting binder.

11. The building material composition according to claim 7, wherein the building material composition is a dry mortar, is formulated as a coating or composite mortar, thermal insulation mortar, sealing compound, gypsum plaster, lime plaster, cement plaster, repair mortar, joint adhesive, ceramic tile adhesive, plywood mortar, bonding mortar, cement primer, cementitious coating for concrete, powder coating, parquet adhesive, smoothing compound and/or trowelling compound.

12. A process for hydrophobising and/or flexibilising cured budding material compositions, the process comprising stirring the building material composition according to claim 7 with water, mixing, applying to a substrate, and drying.

13. The process according to claim 12, wherein the drying takes place under ambient conditions and by means of chemical binding of the water and/or by removing the water by means of evaporation and/or absorption through the substrate.

14. The process according to claim 1, wherein the drying is spray drying.

15. The process according to claim 1, wherein the mixing is carried out in the presence of at least one water-soluble organic polymeric protective colloid, one ionic colloid which is partially soluble or insoluble in water and/or one alkali-soluble polymer.

\* \* \* \* \*